(12) United States Patent
Jaikumar et al.

(10) Patent No.: US 10,691,684 B2
(45) Date of Patent: Jun. 23, 2020

(54) STRUCTURED SEARCH QUERIES

(71) Applicant: BloomReach, Inc., Mountain View, CA (US)

(72) Inventors: Padmini Jaikumar, Mountain View, CA (US); Antariksh Vinod Bothale, Mountain View, CA (US); Omar Eduardo Fernandez, Mountain View, CA (US); Wally Chien Ching Ye, San Jose, CA (US)

(73) Assignee: BloomReach, Inc., Mountain View, CA (US)

( * ) Notice: Subject to any disclaimer, the term of this patent is extended or adjusted under 35 U.S.C. 154(b) by 319 days.

(21) Appl. No.: 15/340,343

(22) Filed: Nov. 1, 2016

(65) Prior Publication Data
US 2018/0121480 A1    May 3, 2018

(51) Int. Cl.
*G06F 16/00*      (2019.01)
*G06F 16/245*    (2019.01)
*G06F 16/242*    (2019.01)

(52) U.S. Cl.
CPC .......... *G06F 16/245* (2019.01); *G06F 16/242* (2019.01)

(58) Field of Classification Search
CPC .................. G06F 17/30389; G06F 16/242
See application file for complete search history.

(56) References Cited

U.S. PATENT DOCUMENTS

| | | | |
|---|---|---|---|
| 6,564,213 B1 | 5/2003 | Ortega | |
| 7,254,569 B2 | 8/2007 | Goodman | |
| 7,885,904 B2 | 2/2011 | Aravamudan | |
| 7,908,287 B1 | 3/2011 | Katragadda | |
| 8,082,264 B2 | 12/2011 | Bierner | |
| 8,316,035 B2 | 11/2012 | Chen | |
| 8,356,041 B2 | 1/2013 | Paek | |
| 8,359,532 B2 | 1/2013 | Chen | |
| 8,812,534 B2 | 8/2014 | Platt | |
| 8,930,350 B1 | 1/2015 | Herscovici | |
| 8,996,550 B2 | 3/2015 | Ko | |
| 9,053,173 B2 | 6/2015 | Mehanna | |
| 9,092,485 B2 | 7/2015 | Rubinstein | |
| 9,727,906 B1* | 8/2017 | Sarmento | G06F 16/355 |
| 2009/0163183 A1* | 6/2009 | O'Donoghue | G06Q 30/02 455/414.1 |
| 2011/0191321 A1* | 8/2011 | Gade | G06F 12/08 707/709 |
| 2011/0258183 A1 | 10/2011 | Gibbs | |
| 2015/0269175 A1* | 9/2015 | Espenshade | G06F 17/3097 706/47 |
| 2017/0357698 A1* | 12/2017 | Chang | G06F 16/26 |

* cited by examiner

*Primary Examiner* — Grace Park
(74) *Attorney, Agent, or Firm* — Moser Taboada

(57) ABSTRACT

A system for generating structured queries and carrying out searches using the structured queries may result in high quality queries and may adequately simulate natural language for suggested search queries. In embodiments, attributes and matching product/services may be extracted from various data sources. Structured queries that include the attributes, products/services, and/or additional terms may be combined to form a structured query. In various embodiments, each structured query may be structured according to a pre-defined pattern that is selected based on the type of relevant product and/or service.

18 Claims, 6 Drawing Sheets

STRUCTURED SEARCH QUERIES

BACKGROUND

A common goal amongst e-commerce retailers is to provide relevant search results in response to search queries for products and/or services. Potential consumers may submit such queries in order to compare products or services, learn more about products or services, or make a purchase.

Potential consumers typically expect relevant results to their search queries, even if such results do not contain the actual terms submitted in the query. In some cases, many user-submitted search queries include query terms that are irrelevant or even counterproductive to the user's intended search target. For example, search query terms may include a product quantity or other details that may not appear on an e-commerce page for the product or service. As another example search query terms are often misspelled.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
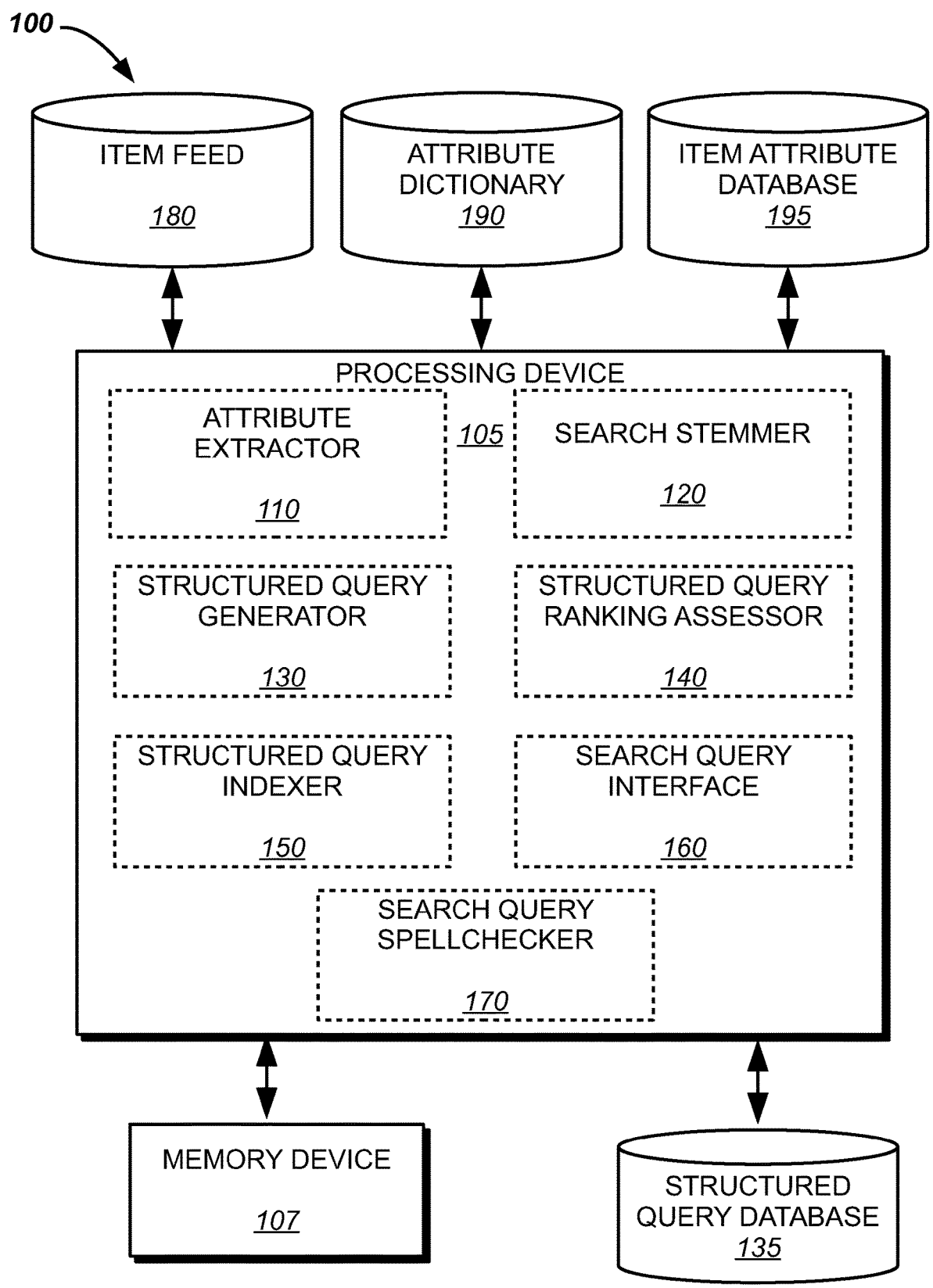
FIG. 1 is a block diagram illustrating a structured query system according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for generating structured search queries for an e-commerce search engine, autosuggesting relevant structured search queries in response to a search request, and executing searches on said structured search queries. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, systems and methods described herein are adapted to generate structured queries for a search engine. Upon submission of a search query by a user, systems of the present disclosure can autosuggest one or more structured queries that are relevant to the submitted search query. Embodiments of the present disclosure include catalog-based auto suggest in response to search queries. FIG. 1 is a block diagram depicting a structured query system 100 according to one embodiment of the present disclosure. In an embodiment, structured query system 100 includes a computer processing device 105 and memory device 107. In one embodiment, memory device 107 has computer-readable instructions to direct processing device 105 to include an attribute extractor 110, search stemmer 120, structured query generator 130, structured query ranking assessor 140, structured query indexer 150, search query interface 160, and search query spellchecker 170. Embodiments of the present disclosure further include one or more of an item feed 180, an attribute dictionary 190, an item attribute database 195, and a structured query database 135.

Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

In one embodiment, item feed 180 comprises an index of products and/or services offered for sale by a merchant. Such products or services may include retail, commercial, business, and/or industrial products or services. In embodiments, item feed 180 includes information regarding such products and/or services, including attributes that describe the products and/or services. As used in the present disclosure, the term "attribute" means an adjective, an adverb, or other descriptive term(s) that, in some manner, set forth one or more qualities, features, traits, and/or characteristics of a service or product. In some cases, an attribute has a type and a value. For example, an attribute describing the material of an apparel item could be described as "material: cotton," where "material" is the attribute type and "cotton" is the value for that attribute type.

According to various embodiments, attribute dictionary 190 comprises a dictionary of pairs, each pair comprising a service or product with one or more corresponding attributes. A service/product attribute pair may include a product and or service that is offered for sale on one or more e-commerce websites and an attribute that describes the product or service. In various embodiments, attribute dictionary 190 includes numerous attributes that were each found to be suitable to describe their respective service(s) and/or product(s). Any attribute may be associated with multiple products and/or services listed in attribute dictionary 190 for which the attribute is a suitable descriptor. Likewise, multiple attributes may be associated with any particular product and/or service listed in attribute dictionary 190 for which the attributes are suitable descriptors.

In various embodiments, attribute extractor 110 is adapted to retrieve entries from item feed 180, the entries relating to a specific product and/or service. In embodiments, attribute extractor 110 can analyze received entries to extract attributes from said entries. In one embodiment, attribute extractor can compare entries from attribute dictionary 190 against terms in item feed 180 to identify and extract attributes from item feed 180.

In some embodiments of the present disclosure, entries in item feed 180 include a product or service description. In some embodiments of the present disclosure, entries in item feed 180 include a heading describing the product and/or service. Embodiments of attribute extractor 110 are adapted to parse the description and/or heading to extract additional attributes. In various embodiments, attributes are transmitted to item attribute database 195 to be stored there for further processing as will be described below.

In embodiments of the present disclosure, search stemmer 120 is adapted to identify and remove ineffective attributes from entries in item attribute database 195. According to embodiments, the term "ineffective attribute" means an attribute that is determined by search stemmer 120 to be not useful or not desirable for the purposes of assisting potential consumers find the products and/or services for which they are searching. In embodiments, various criteria may be used to determine if an attribute is ineffective. In some embodiments, an attribute is deemed ineffective if it comprises a binary "yes/no" value. In some embodiments, an attribute is deemed ineffective if it comprises merchant specific data or metadata regarding a product or service such as a stock keeping unit ("SKU") identifier. In some embodiments, an attribute is deemed ineffective if it is common across all products and/or services such as "in-store-availability."

In embodiments of the present disclosure, structured query generator 130 is adapted to create structured queries using the attributes that remain in item attribute database 195. In embodiments, such structured queries each comprise a text string that could be submitted as a search query to an e-commerce search engine. In embodiments, a structured query comprises one or more attributes that are linked together to describe products or services.

Embodiments of structured query generator 130 are adapted to create structured queries using manually curated, pre-defined rules. In one example, such a rule may define a structured query to include terms following a "brand-color-product" pattern. In another example, such a rule may define a structured query to include terms following a "material size gender product" pattern. Other patterns may define structured queries as individual preference or circumstances may dictate.

In embodiments of the present disclosure, structured query patterns may be designed to emulate the natural language of queries that users submit to search for products or services, while concisely including the relevant attributes of the product and/or service. Thus, the manually-created rules may lead to such structured query patterns that are appropriate for particular types of product and/or service. Accordingly, in some embodiments, different structured query patterns may be selected for different types of products and/or services. In some embodiments, different structured query patterns may be selected for different types of attributes.

In embodiments, structured query generator 130 is adapted to store structured queries at structured query database 135. In one embodiment, each structured query is stored at structured query database 135 and linked with the relevant product(s) and/or service(s). Virtually any number of structured queries may be associated with any particular product or service. In some embodiments, each particular structured query may be associated with virtually any number of products and/or services.

In embodiments of the present disclosure, structured query ranking assessor 140 is adapted to analyze sets of structured queries stored at structured query database 135 to rank the structured queries. In embodiments, various signals may be used to rank the structured queries for each product or service item. Said signals may include, but are not limited to: popularity of the attribute-item combination in user-submitted search queries, frequency of the attribute-item combination in item feed 180 (or other index of products and/or services offered for sale by a merchant), or the specificity of the attribute to that item. In embodiments, rankings of sets of structured queries are stored at structured query database 135 in association with each relevant structured query.

In embodiments of the present disclosure, structured query indexer 150 is adapted to index structured queries stored at structured query database 135 in order to facilitate returning relevant results to queries. As one example, structured queries in structured query database 135 may be indexed according to respectively relevant products and/or services so that in response to a submitted product or service, the top-ranked structured queries relevant to the submitted product and/or service are returned. As another example, structured queries in structured query database 135 may be indexed according to relevant attributes so that in response to a submitted attribute, top-ranked structured queries relevant to the submitted attribute are returned.

In one embodiment, structured query indexer 150 is adapted to index structured queries using Apache Solr. In other embodiments, various platforms for indexing and/or searching are utilized by structured query indexer 150. A custom data schema may be defined as appropriate for indexing the structured search queries. In one embodiment, index handlers may likewise be customized for the purpose of storing structured search queries in connection with attributes and/or respective products and/or services.

In embodiments of the present disclosure, search query interface 160 is adapted to transmit a search interface to a user and prompt the user to submit a query. According to various embodiments, a user may be a potential consumer of various products or services offered by a merchant. Embodiments of search query interface 160 are adapted to receive the search query submitted by users. Such queries may be submitted at a user interface in a merchant software application installed on a mobile computing device (which may generally be referred to as an "app"), in a web browser displaying a website, or by other means. In response to receiving a query from a user, search query interface 160 can provide search suggestions, carry out a search, and return relevant search results to the user as will be described below.

According to various embodiments, search query interface 160 is adapted to transmit a user interface to a user computing device. The user computing device may comprise a mobile computing device, a laptop computer, a desktop computer, a tablet computer, or other like computing devices having a display object for displaying information to the user and an input object for collecting inputs from the user. The input object may comprise a mouse, a keyboard, a touch-sensitive display, or other computer peripherals utilized to accept inputs from a user.

Figure 2:
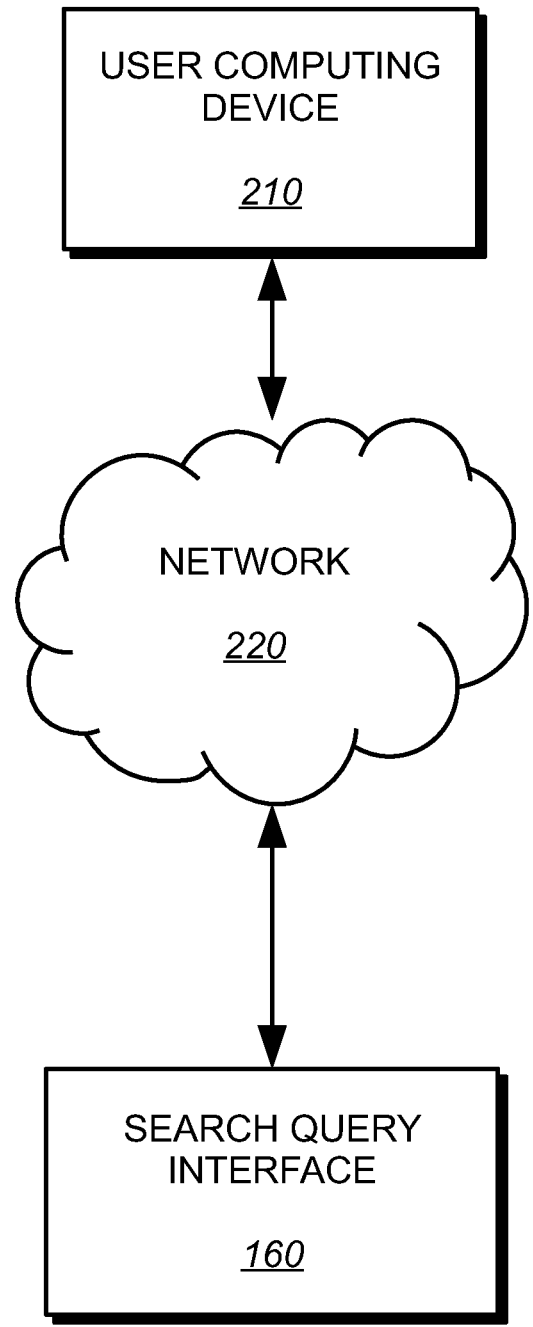
FIG. 2 is a schematic illustrating a network for a structured query system according to one embodiment of the present disclosure.

Referring to FIG. 2, in one embodiment, the user interface is transmitted from search query interface 160 to user computing device 210 over network 220, directing user computing device 210 to prompt a user to enter a search query. The search query may then be transmitted over network 220 to search query interface 160. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

In various embodiments, search query interface 160 receives a text query that was submitted by the user and transmitted via network 220. In some embodiments, search query interface 160 is adapted to request user computing device 210 to transmit the search query text upon each keypress or other action by the user. In another embodiment, search query interface 160 is adapted to request user computing device 210 to transmit the search query text after passage of a predetermined length of time. As each transmission of the search query text is received by search query interface 160, search query suggestions may be returned to user computing device 210 to be displayed to the user.

In embodiments, upon receiving a search query or partial search query, search query interface 160 is adapted to determine if the query text comprises an inferred item. As used in the present disclosure, the term "inferred item" means a product or service item that is stored at item feed 180, of which a name or an attribute is included in the search query text string. In one embodiment, search query interface 160 is adapted to compare one or more terms in the search query text string against item names and/or other item attributes stored at structured query database 135 to determine if the search query includes any inferred items.

In one embodiment, if the search query does not include an inferred item, search query interface 160 is adapted to determine the most relevant items and/or associated attributes from structured query database 135 for which the search query is a prefix. In one embodiment, search query interface 160 can determine which structured queries are most relevant by comparing the popularity of pairs of attributes and items included in previous user-submitted search queries. In another embodiment, structured query database 135 or another item database includes popularity rankings for pairs of attributes and items. In such an embodiment, search query interface 160 can utilize said popularity rankings to determine which pairs of attributes and items are most relevant to the search query.

As an example, if the user inputs "pa" into the search query interface 160, search query interface 160 can interpret the text string "pa" as a prefix for one or more candidate search results. In such a case, search query interface 160 may identify the candidate search results as items that have a name and/or attribute that begin with the prefix "pa." The candidate search results may then be ranked according to relevance and/or item popularity. In one case, search query interface 160 returns the top ranked structured queries that include the term "paper" as an attribute.

In cases where the search query includes an inferred item, search query interface 160 is adapted to return one or more structured queries that include the inferred item. In embodiments, the returned structured queries may be ranked according to relevancy and/or popularity.

According to various embodiment of the present disclosure and as set forth above, search query interface 160 may return one or more structured queries from structured query database 135. In returning such structured queries, search query interface 160 can present the structured queries as selectable suggested queries. In embodiments, the presented structured queries may be listed in order of ranking as determined by search query interface 160. In one embodiment, search query interface 160 can enable user computing device 210 to receive an input from the user of one such suggested structured query. Upon selection of a structured query by the user, search query interface 160 can carry out a search for matching entries in item feed 180 and return relevant search results to the user.

As described above, embodiments of the present disclosure are programmed to auto suggest structured queries that are based on a catalog of items in item feed 180. As such, the generation of structured queries from item feed 180 may be advantageous in cases where a merchant or service provider does not possess a sufficiently-sized index (or indeed, any index) of previous user search queries that could otherwise be autosuggested. Such cases may arise in a cold start of a search engine or for long tail search queries.

In some cases, no structured queries are found to match the submitted search query. In such cases, search query interface 160 is adapted to transmit the submitted search query text string to search query spellchecker 170. In embodiments of the present disclosure, search query spellchecker 170 is adapted to determine which terms in the search query, if any, are misspelled. In one embodiment, search query spellchecker 170 utilizes a spellcheck component of the indexing platform utilized by structured query indexer 150. In one embodiment, search query spellchecker 170 utilizes the spellcheck component of the Apache Solr platform. In one embodiment, search query spellchecker 170 is adapted to compare each term of the search query to terms in the item feed 180 and/or structured query database 135 to identify misspellings and provide corrected spellings.

According to various embodiments, in cases where search query spellchecker 170 has identified misspellings and provided correct spellings, search query interface 160 is programmed to execute the search again with the misspelt term(s) replaced with corrected terms. Thus, search steps as described above may be repeated with the corrected terms. In one embodiment, in cases where search query spellchecker 170 determines that the terms of the search query were spelled correctly, yet no structured queries were identified, search query interface 160 may return an empty set as the search result.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 3:
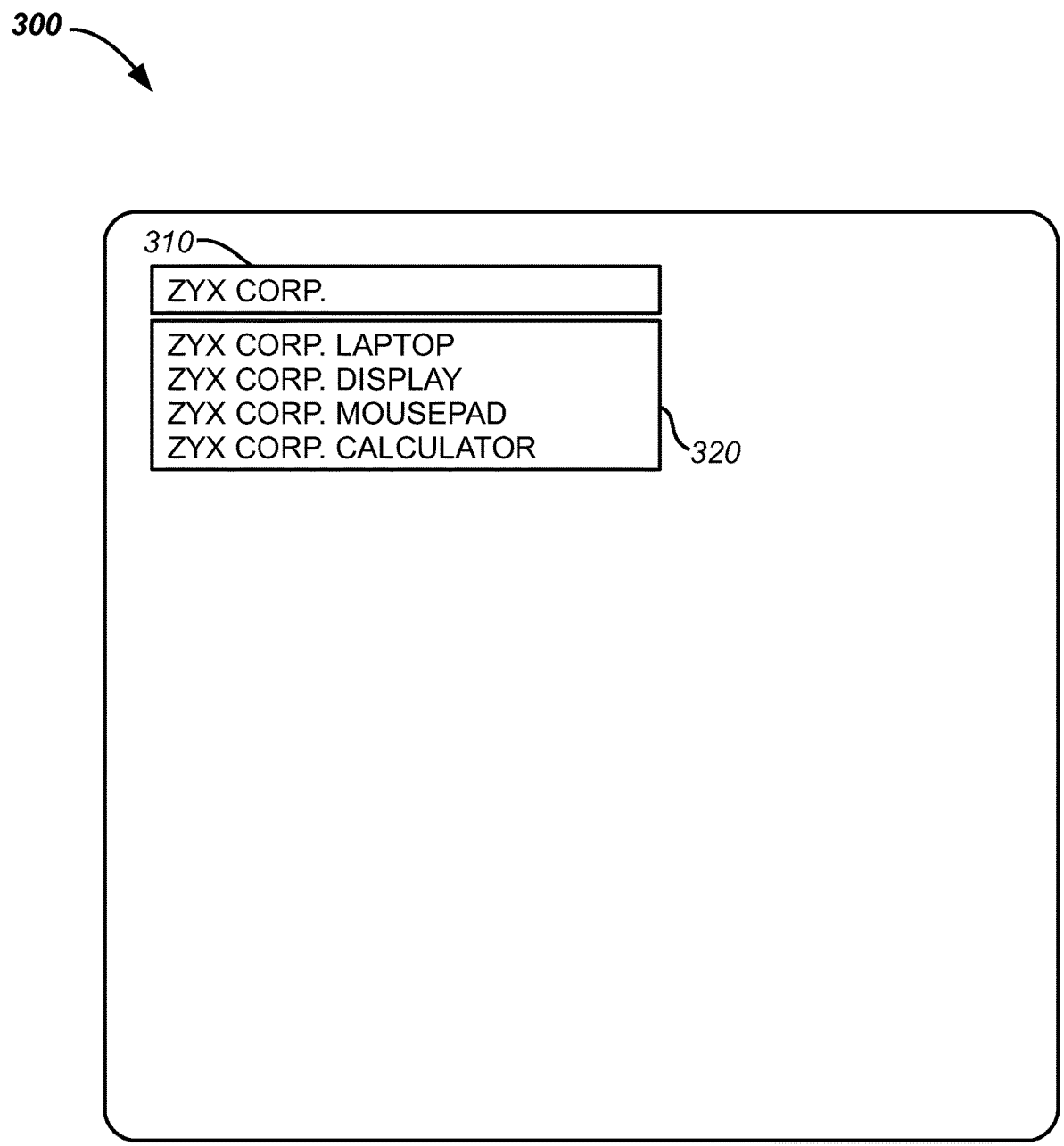
FIG. 3 is an illustration of a user search interface displaying search results for a search query according to one embodiment of the present disclosure.

In operation, embodiments of the present disclosure may generate structured queries following predetermined patterns and/or rules. Embodiments of the present disclosure may receive a search query related to an e-commerce website and/or application, formulate a set of one or more structured queries that match the search query, and execute a search on a selected structured query. Referring now to FIG. 3, an illustrative search interface page 300 is depicted according to one embodiment of the present disclosure. In the embodiment depicted, a search query 310 was submitted by a user, the query 310 comprising a brand name "ZYX CORP." In this illustration, the search query engine identified that the submitted search query includes an attribute for several indexed structured queries at structured query database, the attribute comprising a brand name "ZYX CORP" that is paired in the structured queries with the respective products "LAPTOP," "DISPLAY," "MOUSEPAD," and "CALCULATOR." Accordingly, the search query interface suggested the matching structured queries 320 to the user: "ZYX CORP. LAPTOP," "ZYX CORP. DISPLAY," "ZYX CORP. MOUSEPAD," and "ZYX CORP. CALCULATOR." The user may then select one of the structured queries 320. According to embodiments, upon selection of one of the structured query choices, a search for matching products/services can then be carried out for the selected structured query.

Figure 4:
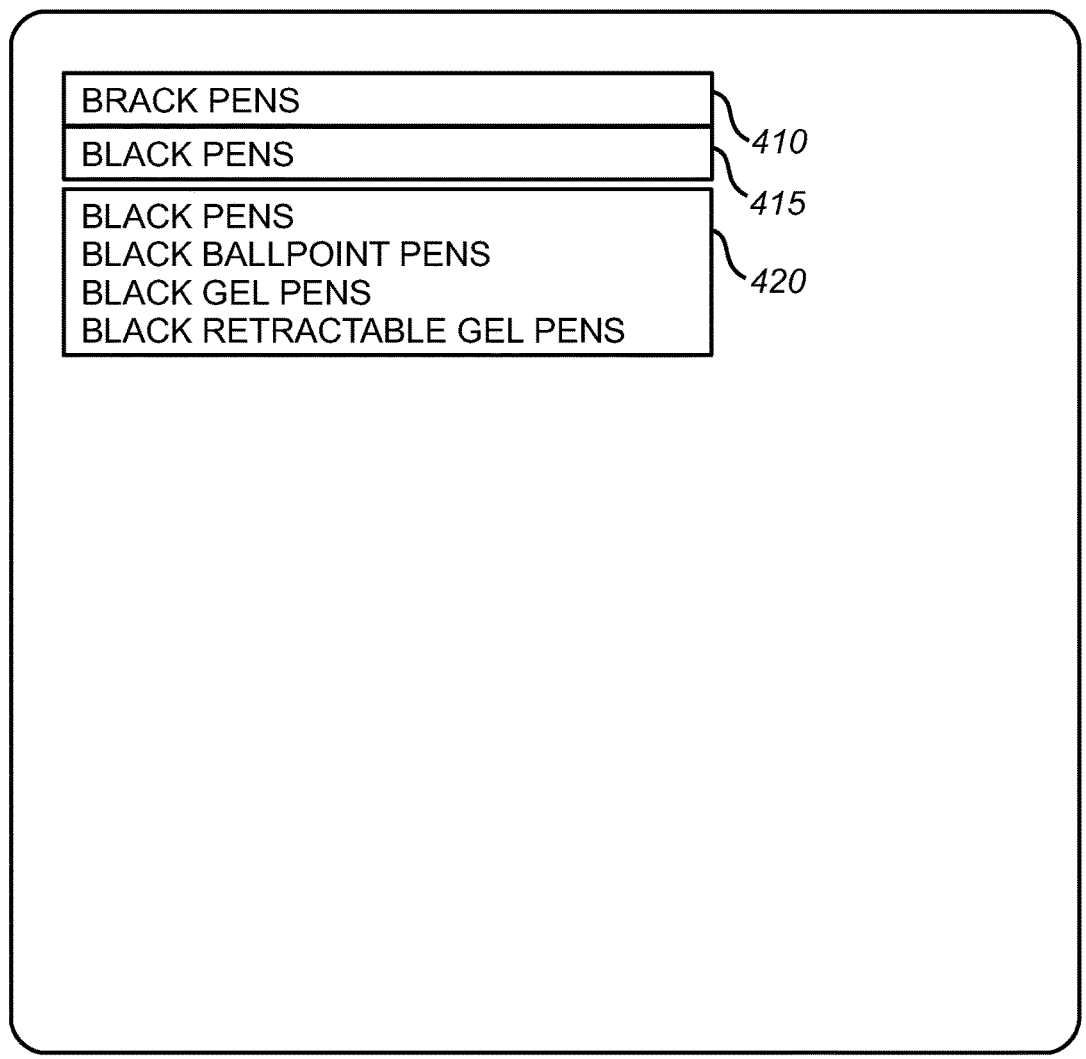
FIG. 4 is an illustration of a user search interface displaying search results for a misspelled search query according to one embodiment of the present disclosure.

Referring now to FIG. 4, an illustrative search interface page 400 is depicted according to one embodiment of the present disclosure. In the embodiment depicted, a search query 410 was submitted by a user, the query 410 comprising the text "BRACK PENS." According to this illustration, no indexed structured queries having an attribute "BRACK" were found at the structured query database. However, the search query spellchecker identified the search term "BRACK" as a misspelling of the attribute "BLACK." Upon executing a search with the corrected query "BLACK PENS" 415, the search query engine identified that the corrected search query includes an attribute for several indexed structured queries, the attribute comprising the attribute "COLOR" having the value "BLACK." The search query interface further identified that the search query includes a product name "PENS," which is found in several indexed structured queries at the structured query database. In this case, the product names include "PENS," "BALLPOINT PENS," "GEL PENS," and "RETRACTABLE GEL PENS." Accordingly, the search query interface presented the matching structured queries 420 to the user: "BLACK PENS," "BLACK BALLPOINT PENS," "BLACK GEL PENS," and "BLACK RETRACTABLE GEL PENS." The user may then select one of the structured queries 420. According to embodiments, upon selection of one of the structured query choices, a search for matching products/services can then be carried out for the selected structured query.

Figure 5:
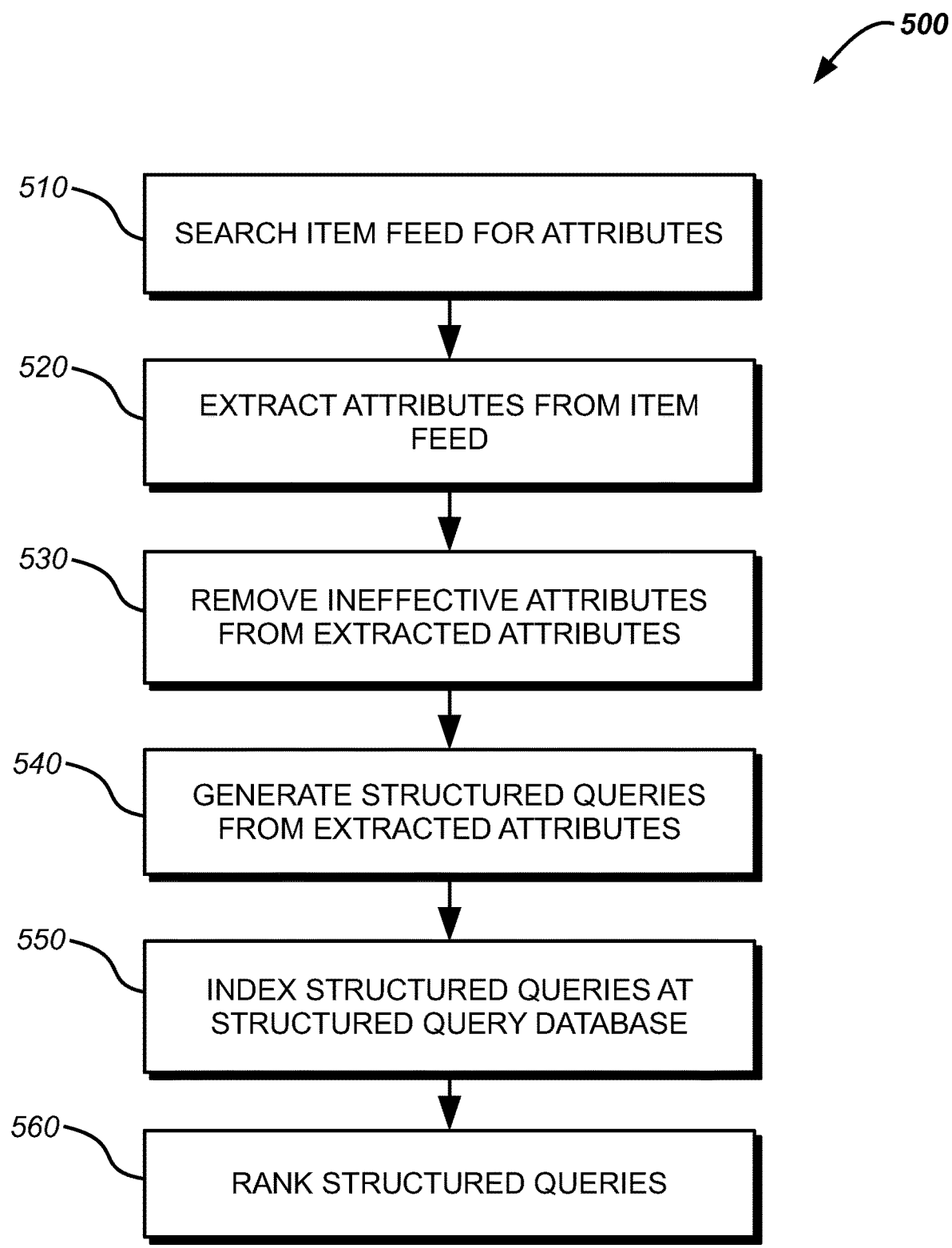
FIG. 5 is a flowchart illustration of a method of generating structured queries according to one embodiment of the present disclosure.

Referring now to FIG. 5, embodiments of the present disclosure include a method 500 of adding structured queries to a structured query database. Method 500 begins at SEARCH ITEM FEED FOR ATTRIBUTES 510. In embodiments of SEARCH ITEM FEED FOR ATTRIBUTES 510, an item feed includes an index of products and/or services that are offered for sale or otherwise made available as potential search results. Embodiments of item feed include multiple individual entries having service or product details. According to various embodiments, an attribute extractor can retrieve service/product entries from the item feed, analyze the entries, and identify product/service attributes in said entries.

In one embodiment of SEARCH ITEM FEED FOR ATTRIBUTES 510, the attribute extractor compares entries from an attribute dictionary to terms in the item feed to identify attributes therein.

Following operation 510, method 500 proceeds to operation 520 EXTRACT ATTRIBUTES FROM ITEM FEED. In embodiments of EXTRACT ATTRIBUTES FROM ITEM FEED 520, attribute extractor extracts attributes identified at operation 510 from the item feed.

In one embodiment of EXTRACT ATTRIBUTES FROM ITEM FEED 520, attribute extractor can gather information related to each extracted attribute, such as the product and/or service described by said attribute, the type of entry in the item feed, the category of the service or product, and other relevant information for the extracted attribute.

In embodiments of EXTRACT ATTRIBUTES FROM ITEM FEED 520, attribute extractor adds extracted attributes to an item attribute database.

Following operation 520, method 500 proceeds to operation 530 REMOVE INEFFECTIVE ATTRIBUTES FROM EXTRACTED ATTRIBUTES. In one embodiment of REMOVE INEFFECTIVE ATTRIBUTES FROM EXTRACTED ATTRIBUTES 530, the search stemmer identifies and removes ineffective attributes from entries in the item attribute database.

According to embodiments of REMOVE INEFFECTIVE ATTRIBUTES FROM EXTRACTED ATTRIBUTES 530, ineffective attributes are attributes that are determined by the search stemmer to be not useful or not desirable for the purposes of assisting potential consumers find the products and/or services for which they are searching. In embodiments, various criteria may be used to determine if an attribute is ineffective. In some embodiments of REMOVE INEFFECTIVE ATTRIBUTES FROM EXTRACTED ATTRIBUTES 530, an attribute is deemed ineffective if it comprises a binary "yes/no" value, if it comprises merchant specific and/or administrative data or metadata regarding a product or service such as a stock keeping unit ("SKU") identifier, or if it is common across all products and/or services such as "in-store-availability."

Following operation 530, method 500 proceeds to operation 540 GENERATE STRUCTURED QUERIES FROM EXTRACTED ATTRIBUTES. In embodiments of GENERATE STRUCTURED QUERIES FROM EXTRACTED ATTRIBUTES 540, a structured query generator creates structured queries from the attributes remaining after operation 530.

In one embodiment of GENERATE STRUCTURED QUERIES FROM EXTRACTED ATTRIBUTES 540, a structured query is generated by combining a product or service name or type with one or more corresponding attributes. In embodiments, said attributes were extracted from the item feed. In one embodiment of GENERATE STRUCTURED QUERIES FROM EXTRACTED ATTRIBUTES 540, a structured query is generated by combining multiple attributes together.

In one embodiment of GENERATE STRUCTURED QUERIES FROM EXTRACTED ATTRIBUTES 540, a structured query is generated to follow a predetermined pattern. In one example, a predetermined pattern is defined as "brand-color-product" (e.g. "ZYX CORP. black pen"). In another example, a predetermined pattern is defined as material-size-gender-product (e.g. "cotton large men shirt"). In other embodiments of GENERATE STRUCTURED QUERIES FROM EXTRACTED ATTRIBUTES 540, structured queries are generated to follow one or more manually-curated patterns as determined by preference or as particular circumstances or needs may call for.

In embodiments of GENERATE STRUCTURED QUERIES FROM EXTRACTED ATTRIBUTES 540, each different product or service type may be given one or more structured query patterns or rules for creating structured query patterns based on available data.

Following operation 540, method 500 proceeds to operation 550 INDEX STRUCTURED QUERIES AT STRUCTURED QUERY DATABASE. In embodiments of INDEX STRUCTURED QUERIES AT STRUCTURED QUERY DATABASE 550, as each structured query is generated, said structured query is indexed at a structured query database. In one embodiment of INDEX STRUCTURED QUERIES AT STRUCTURED QUERY DATABASE 550, structured queries are indexed using the Apache Solr indexing platform.

Following operation 550, the indexed structured queries may be accessed as user search queries are received and processed. Additional structured queries may subsequently be added to the structured query database as they are extracted from the item feed.

Following operation 550, method 500 proceeds to operation 560 RANK STRUCTURED QUERIES. In embodiments of RANK STRUCTURED QUERIES 560, structured query ranking assessor can determine the relevance of each structured query for each related product or service. Structured queries may by then ranked according to relevance.

In one embodiment of RANK STRUCTURED QUERIES 560, the structured queries are dynamically ranked according to user inputs such as the search query and/or user search preferences and/or previous user search behaviors.

In one embodiment of RANK STRUCTURED QUERIES 560, the relevance of each structured query is based on the popularity of the attribute and service/product pair in previous submitted search queries.

In one embodiment of RANK STRUCTURED QUERIES 560, the relevance of each structured query is based on the frequency of the attribute and service/product pair as found in an index of products and/or services offered for sale by a merchant.

Figure 6:
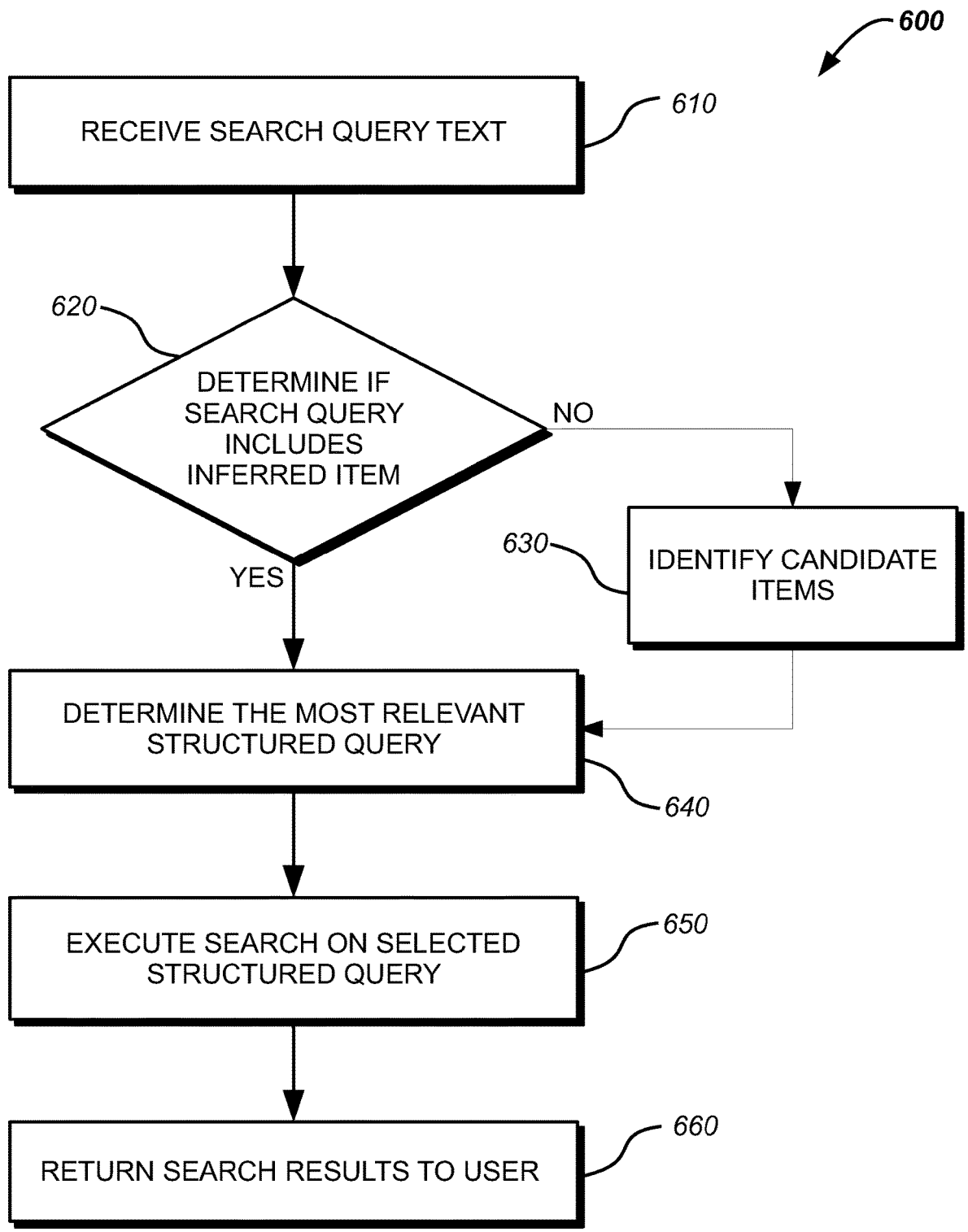
FIG. 6 is a flowchart illustration of a method of executing a structured query search according to one embodiment of the present disclosure.

Referring now to FIG. 6, embodiments of the present disclosure include a method 600 of executing a search for products and/or services in response to a submitted search query on an e-commerce website or application. Method 600 begins at operation 610 RECEIVE SEARCH QUERY TEXT. At operation RECEIVE SEARCH QUERY TEXT 610, a user has submitted a search query via a search query interface. In embodiments of RECEIVE SEARCH QUERY TEXT 610, the user inputs a search query at a search query interface via a browser on a computing device such as a laptop, desktop computer, or a mobile computing device such a smartphone or tablet device.

In other embodiments of RECEIVE SEARCH QUERY TEXT 610, the user inputs a search query at a search query interface via a mobile computing application, which may otherwise be known as an "app," on a mobile computing device such as a smartphone or tablet device. According to various embodiments, the user may be shopping for a product and/or service for which the user searches.

In some embodiments of RECEIVE SEARCH QUERY TEXT 610, a submitted search query comprises a text string. The search query text string may include one or more search terms that are product or service names or attributes of said products and/or services. The search query text string may include misspellings of said search terms.

Following operation 610, method 600 proceeds to operation 620 DETERMINE IF SEARCH QUERY INCLUDES INFERRED ITEM. According to embodiments of DETERMINE IF SEARCH QUERY INCLUDES INFERRED ITEM 620, the search query interface can compare each term of the search query string against product/service names or attributes in the structured query database. If any matching structured queries are identified, it can be determined that the search query string includes an inferred item, the item being the product or service in the matching structured query. In embodiments, multiple inferred items are identified in the search query. Following operation 620, if the search query includes an inferred item, method 600 proceeds to operation 640 DETERMINE THE MOST RELEVANT STRUCTURED QUERY.

Following operation 620, if the search query does not include an inferred item, method 600 proceeds to operation 630 IDENTIFY CANDIDATE ITEMS. According to embodiments of IDENTIFY CANDIDATE ITEMS 630, search query interface is adapted to search for products and/or services and associated attributes stored in entries of the structured query database.

In one embodiment of IDENTIFY CANDIDATE ITEMS 630, search query interface can search the structured query database for entries for which the search query is a prefix. For example, if the user is in the process of submitting the search query string, a partial search query string may be transmitted to search query interface. The partial search query string may then be compared to the beginning characters of the names and/or attributes of products and/or services at the structured query database.

According to various embodiments of IDENTIFY CANDIDATE ITEMS 630, in some cases, the submitted search query or partial search query comprises one or more attributes but no items. In some cases, the submitted search query or partial search query comprises one or more items but no attributes. In some cases, the submitted search query or partial search query comprises both items and attributes.

In one embodiment of IDENTIFY CANDIDATE ITEMS 630, the quantity of characters of the partial search query string is determined before comparing the partial search query string to that quantity of beginning characters from each attribute, product, and/or service name from entries of the structured query database.

In embodiments of IDENTIFY CANDIDATE ITEMS 630, a list of candidate items is assembled, the list comprising one or more candidate items that are found to match the search query string.

Following operation 630, method 600 proceeds to operation 640 DETERMINE THE MOST RELEVANT STRUCTURED QUERY. According to embodiments of DETERMINE THE MOST RELEVANT STRUCTURED QUERY 640, the search query string and the candidate items are analyzed to determine which structured query stored at the structured query database is the most relevant for the submitted search query string.

In one embodiment of DETERMINE THE MOST RELEVANT STRUCTURED QUERY 640, the search query interface can determine which structured query is most relevant by comparing the popularity of items or attributes in previous user-submitted search queries. A structured query that includes a product, service, and/or attribute that is more commonly queried may be selected as the most relevant structured query.

In other embodiments of DETERMINE THE MOST RELEVANT STRUCTURED QUERY 640, the search query interface can determine which structured query is most relevant by comparing the popularity of items in previous purchases. A structured query that includes the most popular product or service may be selected as the most relevant structured query.

In other embodiments of DETERMINE THE MOST RELEVANT STRUCTURED QUERY 640, the search query interface can determine which structured query is most relevant by comparing the rankings of each structured query stored at structured query database.

In other embodiments of DETERMINE THE MOST RELEVANT STRUCTURED QUERY 640, search query interface can determine which structured query is most relevant by comparing the popularity of corresponding items according to various combinations of the above metrics or according to other metrics.

In one embodiment of DETERMINE THE MOST RELEVANT STRUCTURED QUERY 640, multiple structured queries are identified as relevant to the search query string. In embodiments, the multiple selected structured queries may be transmitted to the user computing device and presented to the user as suggested search queries. In some embodiments, a limit is in place to restrict the number of structured queries presented to the user.

In some embodiments of DETERMINE THE MOST RELEVANT STRUCTURED QUERY 640, the most relevant structured queries are presented to the user in order of relevance. The user may select one of the structured queries that best approximates the user's desired search.

Following operation 640, method 600 proceeds to operation 650 EXECUTE SEARCH ON SELECTED STRUCTURED QUERY. According to embodiments of EXECUTE SEARCH ON SELECTED STRUCTURED QUERY 650, the search query interface can carry out a search for entries in an item feed based on the structured query selected by the user.

According to embodiments of EXECUTE SEARCH ON SELECTED STRUCTURED QUERY 650, the search query interface can carry out a search for entries in various databases of products and/or services that are offered for sale including the item feed.

Following operation 650, method 600 proceeds to operation 660 RETURN SEARCH RESULTS TO USER. In embodiments of RETURN SEARCH RESULTS TO USER 660, top ranked search results are transmitted to the user's computing device to be displayed for the user. In one embodiment, the results are displayed in an ordered list according to relevance.

In various embodiments of RETURN SEARCH RESULTS TO USER 660, each listed search result comprises a hyperlink that may facilitate purchase of the corresponding product or service. In one embodiment of RETURN SEARCH RESULTS TO USER 660, the user may interact with the user search interface to view additional details of selected search results.

In one embodiment of the present disclosure, RETURN SEARCH RESULTS TO USER 660 is carried out as a function within a software application on a mobile computing device such as a smartphone or tablet computer. In one embodiment of the present disclosure, RETURN SEARCH RESULTS TO USER 660 is carried out by displaying the search results on a browser.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for adding structured queries to a structured query database of a structured query system, comprising:
   transmitting, over a network, from a search query interface of the structured query system a search interface for installing on a computing device of a user for prompting the user to submit a search query text;
   at an attribute extractor of the structured query system, searching an item feed, thereby identifying attributes;
   at the attribute extractor, extracting attributes from the item feed;
   at a search stemmer of the structured query system, removing ineffective attributes;
   at a structured query generator of the structured query system, generating a structured query from the extracted attributes remaining after the ineffective attributes have been removed according to a structured query pattern;
   at a structured query indexer of the structured query system, indexing the structured query at a structured query database; and
   at a structured query ranking assessor of the structured query system, ranking the indexed structured query comprising determining a relevance of each structured query for a corresponding one of products or service,
   wherein removing the ineffective attributes comprises determining at least one of:
   determining whether or not an attribute comprises a binary yes or no value;
   determining whether or not the attribute is one of merchant specific data or metadata regarding at least one of products or services; or
   determining whether or not the attribute is common across at least one all products or services offered by a merchant.

2. The method of claim 1, wherein searching the item feed comprises comparing an entry of an attribute dictionary against one or more terms in the item feed.

3. The method claim 1, wherein the item feed comprises an index of at least one of products or services offered for sale by a merchant.

4. The method claim 1, wherein the structured query pattern is selected based on a type of item described by the extracted attributes.

5. The method of claim 1, further comprising:
   at the search query interface, receiving over the network the search query text submitted by a user;
   determining a set of suggested structured queries;
   selecting a designated structured query of the set of suggested structured queries; and
   executing a search on the designated structured query.

6. The method of claim 5, further comprising returning a set of search results to the user.

7. The method of claim 5, wherein selecting a designated structured query of the set of suggested structured queries comprises receiving a structured query selection from the user.

8. The method of claim 5, wherein determining a set of suggested structured queries comprises determining if the search query includes an inferred item.

9. The method of claim 1, wherein ranking the indexed structured query is based on at least one of a popularity of an attribute-item combination in user-submitted search queries, frequency of the attribute-item combination in at least one of the item feed or at least one of an index of products or services offered for sale by a merchant, a specificity of the attribute to an item, or a user input comprising at least one of a search query, user search preferences, or previous user search behaviors.

10. The method of claim 1, further comprising at a search query spellchecker, determining which terms of the search query comprise a misspelled word.

11. A computer system for executing a search comprising:
    a search query interface adapted to transmit over a network a search interface for installing on a computing device of a user for prompting the user to submit a search query text;
    an attribute extractor, adapted to search an item feed to identify and extract attributes therefrom, thereby resulting in a group of extracted attributes, wherein the item feed comprises at least one of an index of products or services with corresponding attributes;
    a search stemmer adapted to remove selected attributes from the group of extracted attributes based on a determination that the attribute is ineffective, thereby creating a stemmed group of extracted attributes, wherein the determination that the attribute is ineffective comprises at least one of determining whether or not the attribute comprises a binary yes or no value; determining whether or not the attribute is one of merchant specific data or metadata regarding at least one of products or services; or determining whether or not the attribute is common across at least one of all products or services offered by a merchant;
    a structured query generator adapted to generate structured queries from remaining stemmed group of extracted attributes, the structured queries being patterned after one or more pre-defined rules;
    a structured query indexer adapted to index the structured queries stored at a structured query database; and
    a structured query ranking assessor adapted to rank the indexed structured query comprising determining a relevance of each structured query for a corresponding one of products or services.

12. The system of claim 11, wherein the structured query ranking assessor is further adapted to rank the indexed structured queries based on at least one of a popularity of an attribute-item combination in user-submitted search queries, frequency of the attribute-item combination in at least one of the item feed or at least one of an index of products or services offered for sale by a merchant, a specificity of the attribute to an item, or a user input comprising at least one of a search query, user search preferences, or previous user search behaviors.

13. The system of claim 11, wherein the search query interface is further adapted to:
    receive over the network the search query text submitted by a user;
    determine if the search query text includes an inferred item, the inferred item comprising a name of an item identified in one of the structured queries that are indexed at the structured query database;
    if the search query text includes an inferred item, identify a set of candidate structured queries that include the inferred item;
    if the search query text does not include an inferred item, identify a set of candidate structured queries based on similarity to the search query text;
    receive a selection of a selected structured query from the set of candidate structured queries; and
    execute a search on the selected structured query.

14. The system of claim 13, further comprising a search query spellchecker adapted to determine which terms of the search query text, if any, comprise a misspelled word.

15. The system of claim 13, wherein the search query interface is adapted to search the structured query database for entries for which the search query text is a prefix.

16. The system of claim 11, wherein the attribute extractor is adapted to search the item feed by comparing an entry of an attribute dictionary against one or more terms in the item feed.

17. The method of claim 1, wherein removing the extracted attribute based on the determination that the attribute is ineffective further comprises determining if the attribute is one of not useful or not desirable for assisting potential consumers find at least one of products or services for which they are searching.

18. The system of claim 11, wherein the search stemmer is further adapted to determine if the attribute is one of not useful or not desirable for assisting potential consumers find at least one of products or services for which they are searching.

\* \* \* \* \*